No. 885,996. PATENTED APR. 28, 1908.
H. HENTHORNE.
NUT LOCK.
APPLICATION FILED JAN. 6, 1908.

Witnesses
Benj. Finckel
Alice B. Cook

Inventor
Henry Henthorne
by Finckel & Finckel
his Attorneys

UNITED STATES PATENT OFFICE.

HENRY HENTHORNE, OF NEWARK, OHIO.

NUT-LOCK.

No. 885,996.              Specification of Letters Patent.         Patented April 28, 1908.

Application filed January 6, 1908.  Serial No. 409,456.

*To all whom it may concern:*

Be it known that I, HENRY HENTHORNE, a citizen of the United States, residing at Newark, in the county of Licking and State of Ohio, have invented a certain new and useful Improvement in Nut-Locks, of which the following is a specification.

The object of this invention is to provide an improved nut lock that can be used in connection with the standard bolt and without alteration of the bolt preparatory to such use.

The invention is embodied in the instance of it herein shown and described, the invention not being confined to such instance.

Figure 1:
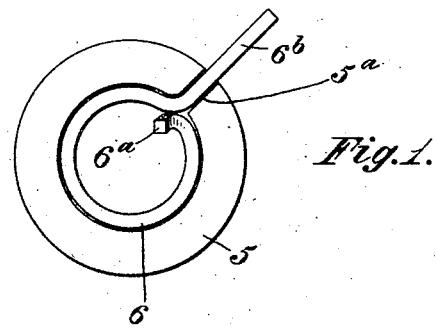
Figure 2:
Figure 3:
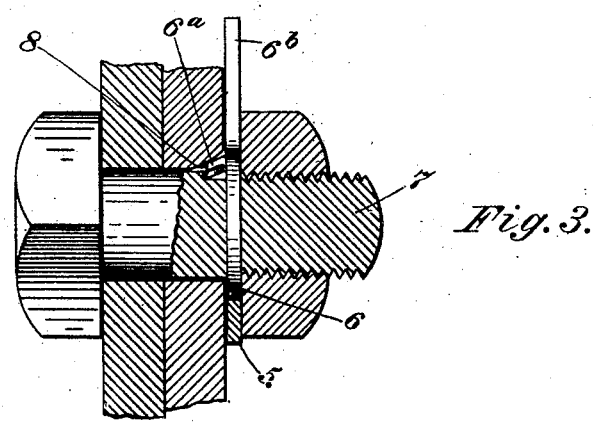
Figure 4:
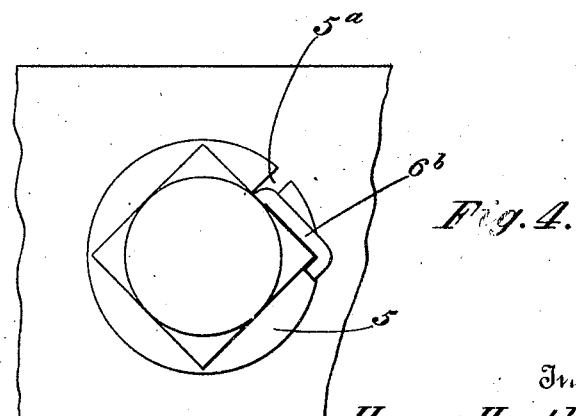

In the accompanying drawings—Figure 1 is a plan view of the washer and lock; Fig. 2 is an edge view of the same; Fig. 3 is a view partly in section showing the lock and nut applied but without the nut-locking finger bent to lock the nut; Fig. 4 is a view looking at the parts from the right-hand side of Fig. 3 but with the nut-locking finger turned down to nut-locking position.

In the views 5 designates the washer, which is in the form of a ring with an opening $5^a$ in one side. The locking device consists of a piece of wire, preferably square in cross section, bent to form a ring portion 6 with a short spur $6^a$ bent outwardly with reference to the plane of the washer and inwardly with reference to the axis of the washer, and with a rather long radially extending finger $6^b$. The ring is made of such diameter that on slight contraction it fits and remains by friction within the opening of the washer 5 while the finger $6^b$ stands radially in the opening $5^a$ thereof. Internally the ring is of a diameter ample to permit it and the washer to be passed easily onto the threaded end of the bolt. The bolt is designated 7.

In practice the outer part of the parts to be secured together is first notched with a cold chisel, or file if necessary, at the bolt hole, as seen at 8, so that when the spur $6^a$ is placed opposite said notch and driven therein its point is directed downward and by penetration indents and engages the bolt. The square corner of the spur facilitates the penetration of the spur and but very slight penetration suffices to effect the securing of the bolt from rotation with reference to the parts to be secured. The nut is turned up as tightly as desired and the nut-locking finger $6^b$ bent first forward out of the opening $5^a$ and then laterally across a side of the nut and around one of its corners, as best seen in Fig. 4. It will be observed, therefore, that the nut is locked from turning with reference to the bolt and, as before stated, the bolt is locked from turning in the parts secured. It is better to first drive home the washer and locking device on the bolt before turning up the nut, because the locking device will prevent the bolt from rotating while the nut is being turned. With this invention, therefore, the ordinary bolt having a plain round or cylindrical shank and destitute in itself of means for preventing it from turning when inserted in a bolt hole is rendered available for use.

What I claim and desire to secure by Letters Patent is:

1. In a nut lock, the combination with a washer having a central opening, of the locking device consisting of a wire rod bent to form a ring to fit within the wall of said central opening, said rod also having at one end a bolt-engaging spur and at the other end a finger to be bent to engage the superposed nut.

2. In a nut lock, the combination with a washer having a central opening and an open passage from said central opening through the washer, of the locking device consisting of a wire rod bent to form a ring to fit within the wall of the central opening of the washer, said rod also having at one end a bolt-engaging spur and at the other end a nut-engaging finger, said finger extending through said open passage from the central opening.

3. In a nut lock, the combination with a washer having a central opening and a radial opening, of a locking device consisting of a wire rod bent to form a ring to fit within the wall forming the said central opening, and having at one end a bolt-engaging spur bent outwardly from the plane of the washer and inwardly with reference to the axis thereof, and at the other end forming a finger extending through the radial opening and having its end adapted to be bent to engage a superposed nut.

4. In a nut lock, the combination with the washer having a central opening, of a locking device consisting of a wire rod square in cross section bent to form a ring to fit within the wall of the central opening of the washer and having at one end a bolt-engaging spur formed by a corner of said square rod, and at its other end a finger adapted to be bent to engage and lock the superposed nut.

HENRY HENTHORNE.

Witnesses:
CHARLES A. LEDERER,
C. P. WILSON.